Figure 1:
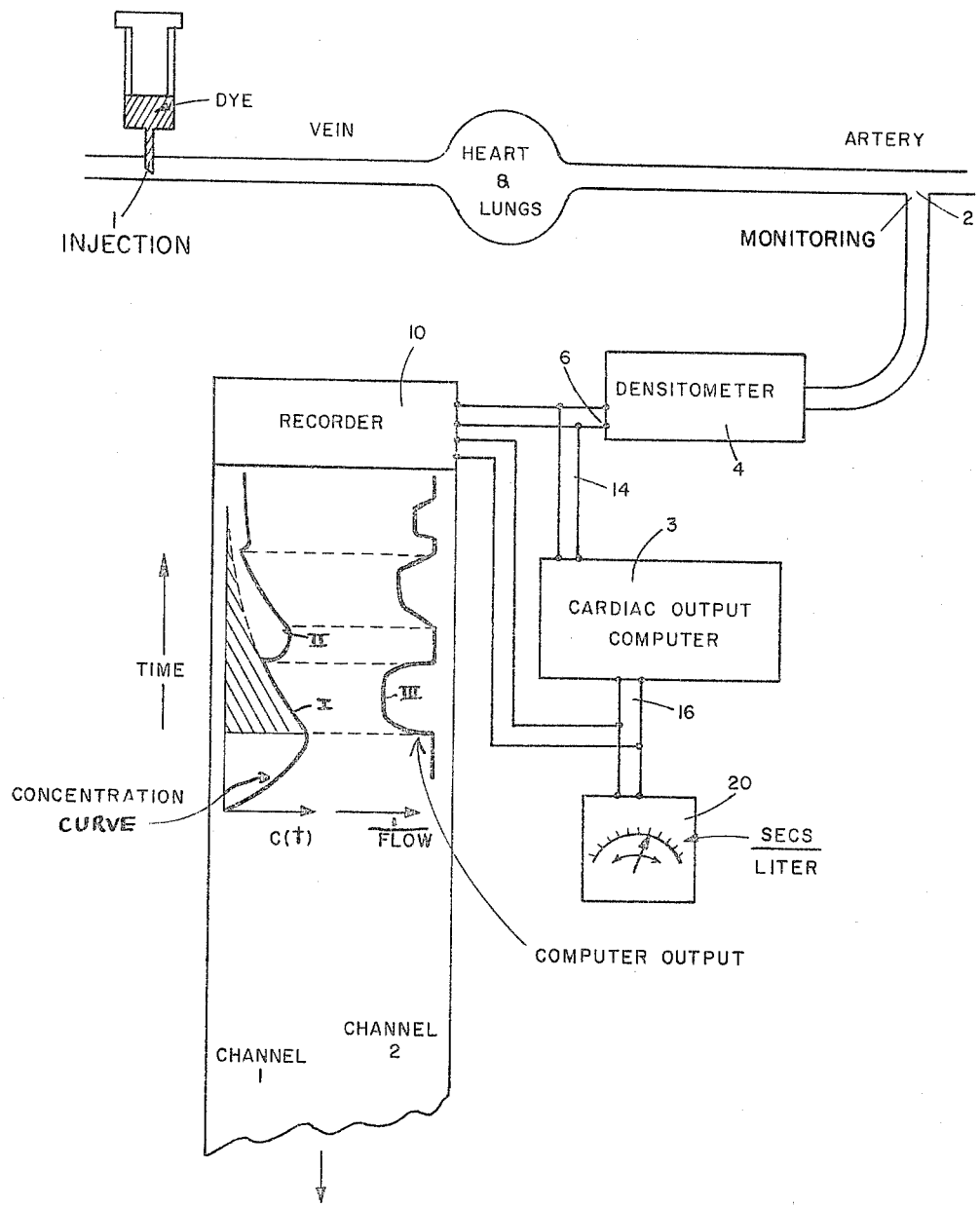

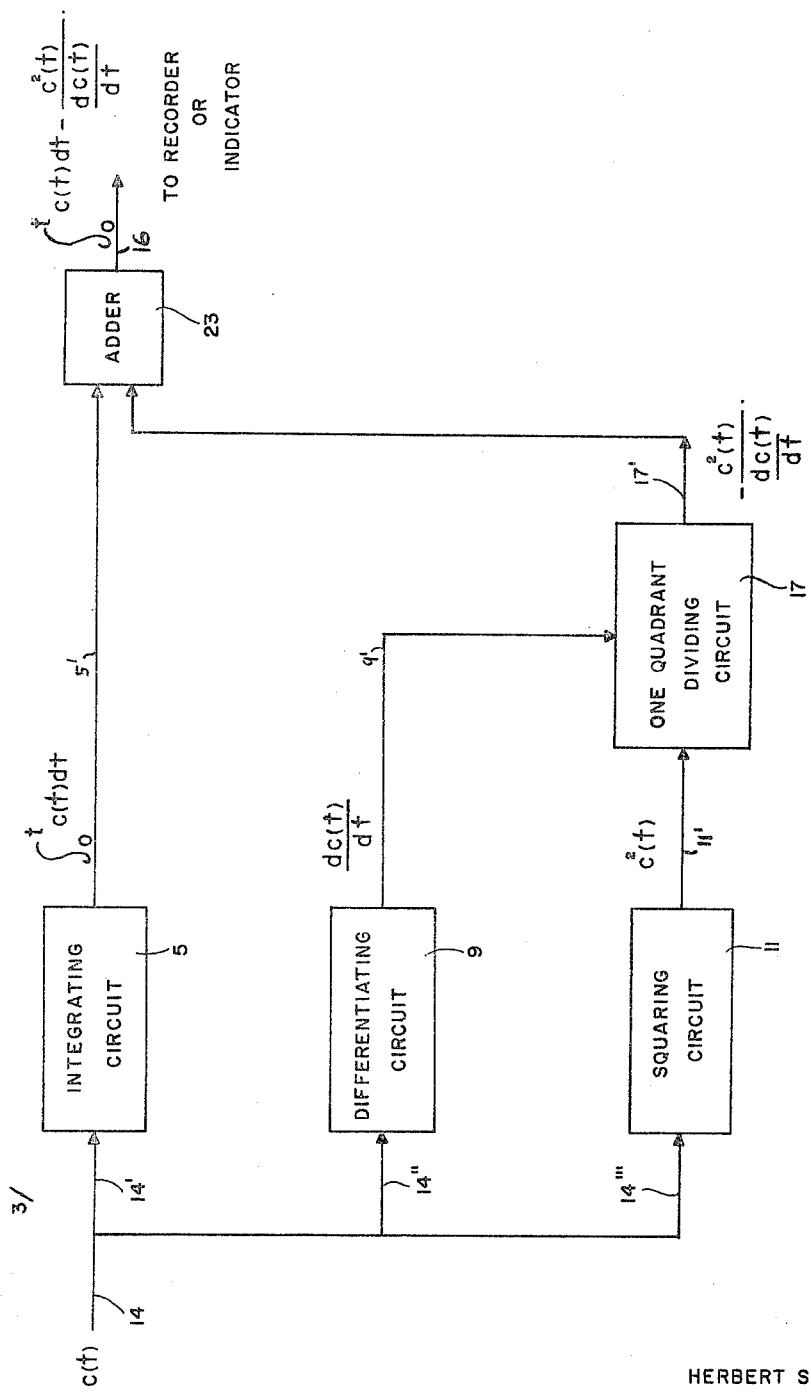

3,269,386
METHOD OF AND APPARATUS FOR FLOW
MEASUREMENTS
Herbert Sherman, 3 Bates Road, Lexington, Mass.
Filed July 12, 1963, Ser. No. 294,561
12 Claims. (Cl. 128—2)

The present invention relates to methods of and apparatus for flow measurements and, more specifically, to the measurement of the cardiac output of a patient; that is, a measure of the quantity of blood pumped per unit time past a predetermined region of the circulatory system.

In accordance with present-day practice, substances, such as dyes, saline solutions and the like, are injected into a predetermined point in the circulatory system of a patient, and the arrival of that substance at another point of the circulatory system is monitored. By this means, a so-called concentration curve may be plotted on a recorder graph, presenting an indication along the ordinate of the concentration of the injected substance in the blood passing the predetermined point at which a measurement is being made, as a function of time, which is measured along the abscissa in the graph produced by the recorder. This concentration curve may be employed for such purposes as a determination of the fluid-flow rate and a measure of the mean transit time between the point of injection and the point of monitoring or sampling, from the latter of which one may determine the volume of fluid between those points. The concentration curve follows the pattern of a relatively steeply rising leading edge which reaches a maximum and then slopes down somewhat exponentially. At some point during the exponential decay or falling edge of the curve, the recirculation of the blood in the circulatory system carries what is left of the injected substance or sample back past the point of monitoring and reproduces a second smaller amplitude curve of the same character.

It is desired, as hereinafter explained, to obtain a measurement of the area underlying this curve, including only the uninterrupted exponential decay; so that the presence of such recirculating curves constitutes an artifact that must be ignored. This result is attained, in accordance with present day practice, by plotting the before-mentioned concentration curve on logarithmic paper so that the exponential decay portion thereof is a substantially straight downwardly sloping line. When that line commences to rise again, the remainder of the curve is ignored and a straight line is extrapolated downwardly. A point-by-point measurement of concentration and summing will then enable the obtaining of the area underneath the concentration curve as thus extrapolated. That area when divided into the quantity of the injectate or substance injected into the blood, is a measure of the quantity of blood passing per unit time past some particular region of the circulatory system.

Attempts have also been made to adapt computer techniques to this type of measurement, including the utilization of function generators which will match to the slope of the exponential decaying portion of the characteristic and thus will generate a function that replaces the actual curve. This, however, gives only a single possible value for the area and is not adapted for correction and correlation to the possibly changing conditions of the exponential decay portion of the curve in actual practice. In addition, the equipment is complicated and expensive.

The complexity of this operation has heretofore prevented automatic accurate commercial instrumentation, and the obtaining of a computation for a patient has been laborious and time consuming. It has thus been practically impossible, in many cases, for the physician even to have this important bit of diagnostic data available at the time of the examination.

An object of the present invention, accordingly, is to provide a new and improved method and apparatus of this character that enable a facile and continual prediction of the area under the extrapolated exponential decay curve during measurement operations.

A further object is to provide a novel cardiac output computation apparatus.

Other and further objects will be explained hereinafter and will be more particularly pointed out in connection with the appended claims.

The invention will now be described in connection with the accompanying drawing, FIG. 1 of which is a schematic drawing illustrating the application of the invention to the blood flow problem; and FIG. 2 is a block diagram of a computer circuit for operating upon the cardiac output information obtained in the system of FIG. 1 to produce a measure of this flow.

Referring to FIG. 1, a dye or saline solution or other injectate is shown inserted at 1 into the vein of a patient. A catheter is shown in an artery on the other side of the heart and lungs, at region 2, for obtaining a sample or a measurement of the passage of the dye or other injectate past the region 2, as a function of time. In the illustrated example, a densitometer 4 that measures the color of the dye is employed to transduce the change in density to an electric signal that may be fed from output terminals 6 to one of the input channels of any conventional recorder 10, and also simultaneously to a cardiac output computer 3 of a type hereinafter described. Other measuring or monitoring devices than densitometers may also be employed. If a saline solution is used as the injectate at 1, as another example, the densitometer 4 may be replaced by a conductivity bridge that will measure the changing conductivity of the blood sample resulting from the presence of the saline solution.

The output of the computer 3 may be fed at 16 to a conventional meter or other indicator 20, calibrated in terms of time-per-unit-volume flowing (such as seconds per liter). The output 16 may also feed a second input channel of the recorder 10, as later described. The recorder 10, which is shown for illustrative purposes as a two-channel paper-strip device, such as the Sanborn Company Model 150, will indicate along the length of the strips, the concentration curve, so labeled on one channel, and the output of the computer 3, again so labeled, on the other channel. The before-mentioned secondary or recirculation portion of the concentration curve is shown at II, following the exponential decaying portion of the main curve I. The shaded area extrapolated from the exponential decay portion I is the area to be measured.

The computer 3, as more particularly illustrated in FIG. 2, receives electrical signals corresponding to an analog of the computation curve (repersented by $c(t)$) from the output 14 of the densitometer 4. These signals are applied in three paths; first, by way of conductors 14' to an integrating circuit 5 (as of the type described in "Electronic Analog Computers," by Korn & Korn, published by McGraw-Hill, 1952, on page 229); secondly, by conductors 14" to a differentiating circuit 9 (such as the type described on page 11 of the said text); and, lastly, by conductors 14''' to a squaring circuit 11 (as of the type described on page 229 of the Korn text).

The output of the integrating circuit 5 continually represents the time-integration of the input signals $c(t)$ and is applied at 5' to a later-described adder circuit 23. The differentiated output of the differentiating circuit 9 is applied by conductors 9' to a one-quadrant dividing circuit 17, the other input of which is fed at 11' from the squaring circuit 11 and represents $c^2(t)$. The circuit 17 may, for example, be of the type described in the aforementioned Korn & Korn text on page 229, responding only in the event that the output of the differentiating circuit 9 has the predetermined exponential decay or negative slope of the conductivity curve I, so that all other portions of the curve will not produce an output at the circuit 17. When, however, the quadrant dividing circuit 17 monitors a signal output from the differentiating circuit 9 that has this predetermined negative decay characteristic, an output will be produced at 17' representing the shaded predicted area under the predicted exponential curve I, corresponding to the particular signal then applied to differentiating circuit 9. Successively different predicted curves will be produced along this decaying characteristic so that there is correction at all times for the actual decaying characteristic of the concentration curve, as further distinguished from the prior-art systems previously described.

In addition, the output $$-c^2(t)/\frac{dc(t)}{dt}$$

at 17', representing the predicted area, is added to the integrated area of the curve, thus far represented in the output 5' of the integrating circuit 5, in the adder 23. The adder circuit 23 may be of the type described in the aforementioned Korn & Korn text, on page 11.

A comparison of the analog-signal-produced concentration curve and the computer output is readily afforded at the recorder 10. The physician will known readily the accuracy of the measurements at the recorder 10, because only when the input signals have reached the exponentially decaying portion I of the characteristic curve will there be an output from the one-quadrant dividing circuit 17. Only at that time, thus, will the computer output signal indicated along a "channel 2" of the recorder show a steady portion III, indicative of the attainment of the exponential decaying portion of the curve. Similarly, the meter needle at the indicator 20 will be steady at such time, again showing the physician that the measurement is accurate and not an artifact.

Further modifications will obviously suggest themselves to those skilled in the art, and other arrangements of multipliers, differentiators, and other circuit components may obviously be employed to practice the underlying technique of the invention; all such being considered to fall within the spirit and the scope of the invention as defined in the appended claims.

What is claimed is:

1. A method of computing the area under a blood-carried injectant concentration-curve, an unknown predetermined portion of which follows a substantially decaying exponential law having a predetermined negative-slope characteristic, that comprises, producing successive electrical signals that are the analog of the curve, continually integrating the signals, continually predicting from the successive signals successive areas corresponding to areas under predicted curves following the said substantially exponential law, monitoring the signals until a signal is reached that has the said predetermined negative-slope characteristic, and thereupon adding to the integrated signals the then-predicted area to produce a measure of the rate of flow of the injectant.

2. A method of computing the area under a blood-carried injectant concentration-curve, an unknown predetermined portion of which follows a substantially decaying exponential law having a predetermined negative-slope characteristic, that comprises, producing successive electrical signals, that are the analog of the curve, continually integrating the signals, continually predicting from the successive signals further signals representative of successive areas corresponding to areas under predicted curves following the said substantially exponential law, monitoring the signals until a signal is reached that has the said predetermined negative-slope characteristic, and thereupon adding to the integrated signals the then-predicted further signal representative of the then-predicted area to produce a measure of the rate of flow of the injectant.

3. A method of computing the area under a blood-carried injectant concentration-curve, an unknown predetermined portion of which follows a substantially decaying exponential law having a predetermined negative-slope characteristic, that comprises, monitoring the concentration of blood flow, producing from the monitored blood flow successive electrical signals that are the analog of the curve, continually integrating the signals, continually predicting from the successive signals successive areas corresponding to areas under predicted curves following the said substantially exponential law, monitoring the signals until a signal is reached that has the said predetermined negative-slope characteristic, and thereupon adding to the integrated signals the then-predicted area to produce a measure of the rate of flow of the injectant.

4. A method of computing the area under a blood-carried injectant concentration-curve, an unknown predetermined portion of which follows a substantially decaying exponential law having a predetermined negative-slope characteristic, that comprises, monitoring the concentration of blood flow, producing from the monitored blood flow successive electrical signals that are the analog of the curve, continually integrating the signals, continually predicting from the successive signals further signals representative of successive areas corresponding to areas under predicted curves following the said substantially exponential law, monitoring the signals until a signal is reached that has the said predetermined negative-slope characteristic, and thereupon adding to the integrated signals the then-predicted further signal representative of the then-predicted area to produce a measure of the rate of flow of the injectant.

5. A method as set forth in claim 1 and in which the further step is performed of indicating the said electric analog signals in comparative relation with the said measure of the rate of flow.

6. A method as claimed in claim 1 and in which the said predicting step comprises differentiating the said electrical signals, squaring the said electrical signals, and dividing the squared signals by the differentiated signals to produce signals representative of the said then-predicted area.

7. A method as claimed in claim 2 and in which the said predicting step comprises differentiating the said electrical signals, squaring the said electrical signals, and dividing the squared signals by the differentiated signals to produce signals representative of the said then-predicted area.

8. A blood-flow measuring apparatus for computing the area under a blood-carried injectant concentration curve, an unknown predetermined portion of which follows a substantially decaying exponential law having a predetermined negative-slope characteristic, the apparatus having, in combination, means for detecting the concentration of injectant in blood flow, means for transducing the detected flow into successive electrical signals that are the analog of the said concentration curve, integrator means for continually integrating the signals, computer means for continually producing from the successive signals predicted signals representative of successive areas corresponding to areas under predicted curves following the said exponential law, means for monitoring the signals until a signal is reached that has the said negative-slope characteristics, and means operable thereupon to add to the integrated signals the then-predicted area signals to produce a measure of the rate of flow of the injectant.

9. A blood-flow measuring apparatus as claimed in claim 8 and in which the said computer means comprises differentiating and squaring means each connected to the producing means for respectively differentiating and squaring the said electrical signals, and divider means for dividing the squared signals by the differentiated signals to produce the said then-predicted area signals.

10. A blood-flow measuring apparatus as claimed in claim 8 and in which the said transducing means comprises a densitometer.

11. A blood-flow measuring apparatus as claimed in claim 8 and in which recording means is provided connected to the transducing means to indicate the said concentration curve and to the adding means to indicate the rate of flow of the injectant.

12. A blood-flow measuring apparatus as claimed in claim 8 and in which means is provided for indicating steady conditions in the output of the adding means indicative of the attainment of the said negative-slope characteristic portion of the concentration curve.

References Cited by the Examiner

UNITED STATES PATENTS

| | | | |
|---|---|---|---|
| 2,375,059 | 5/1945 | Williams et al. | 128—2.05 |
| 2,944,542 | 7/1960 | Barnett et al. | 128—2.05 |
| 3,075,515 | 1/1963 | Richards | 128—2.05 |
| 3,131,689 | 5/1964 | Rodler | 128—2.1 |
| 3,149,627 | 9/1964 | Bagno | 128—2.1 |

OTHER REFERENCES

"Method for Recording Pressure . . .," by Peterson et al., pages 771–782 of American Heart Journal, 1949.

RICHARD A. GAUDET, *Primary Examiner.*

SIMON BRODER, *Examiner.*